United States Patent
Wu et al.

(10) Patent No.: US 11,937,234 B2
(45) Date of Patent: Mar. 19, 2024

(54) TRANSMISSION CONFIGURATION INDICATION TRANSMISSION METHOD AND DEVICES

(71) Applicant: ZTE CORPORATION, Guangdong (CN)

(72) Inventors: Hao Wu, Guangdong (CN); Bo Gao, Guangdong (CN); Chuangxin Jiang, Guangdong (CN); Shujuan Zhang, Guangdong (CN); Zhaohua Lu, Guangdong (CN); Yijian Chen, Guangdong (CN); Yu Ngok Li, Guangdong (CN)

(73) Assignee: ZTE Corporation, Guangdong (CN)

( * ) Notice: Subject to any disclaimer, the term of this patent is extended or adjusted under 35 U.S.C. 154(b) by 492 days.

(21) Appl. No.: 17/280,370

(22) PCT Filed: Sep. 20, 2019

(86) PCT No.: PCT/CN2019/107039
§ 371 (c)(1),
(2) Date: Mar. 26, 2021

(87) PCT Pub. No.: WO2020/063480
PCT Pub. Date: Apr. 2, 2020

(65) Prior Publication Data
US 2022/0039123 A1     Feb. 3, 2022

(30) Foreign Application Priority Data
Sep. 28, 2018   (CN) .......................... 201811142057.X

(51) Int. Cl.
*H04W 72/1268*     (2023.01)
*H04L 5/00*     (2006.01)
(Continued)

(52) U.S. Cl.
CPC ....... *H04W 72/1268* (2013.01); *H04L 5/0051* (2013.01); *H04W 72/0446* (2013.01); *H04W 72/23* (2023.01); *H04W 72/54* (2023.01)

(58) Field of Classification Search
CPC ......... H04W 72/1268; H04W 72/0446; H04W 72/23; H04W 72/54; H04W 72/542;
(Continued)

(56) References Cited

U.S. PATENT DOCUMENTS

2017/0288743 A1   10/2017 Nam et al.
2017/0366377 A1   12/2017 Papasakellariou
(Continued)

FOREIGN PATENT DOCUMENTS

CN   106559879 A   4/2017
CN   107888266 A   4/2018
(Continued)

OTHER PUBLICATIONS

Notice of First Review Opinion for Chinese Patent Application No. 201811142057.X, dated May 17, 2022 (six (6) pages).
(Continued)

*Primary Examiner* — Kiet Tang
(74) *Attorney, Agent, or Firm* — KDW Firm PLLC

(57) ABSTRACT

Provided are an information transmission method and a relevant device. The method includes: a terminal receiving first signaling and second signaling, where the first signaling is configured for indicating a transmission configuration indication (TCI) state, and the second signaling is configured for triggering a first reference signal indicated in the TCI state; and the terminal determining, according to the first signaling, a target channel or a target signal scheduled by the first signaling, where the target channel or the target signal scheduled by the first signaling uses quasi-co-location (QCL) information corresponding to the first reference sig-
(Continued)

A base station sends first signaling and second signaling, where the first signaling includes a TCI state, and the second signaling is configured for triggering a first reference signal indicated in the TCI state, where a target channel or a target signal scheduled by the first signaling uses QCL information corresponding to the first reference signal transmitted before a first symbol or QCL information corresponding to the second signaling transmitted before a first symbol — 201 nal transmitted before a first symbol or QCL information corresponding to the second signaling transmitted before a first symbol.

18 Claims, 3 Drawing Sheets

(51) Int. Cl.
*H04W 72/0446* (2023.01)
*H04W 72/23* (2023.01)
*H04W 72/54* (2023.01)

(58) Field of Classification Search
CPC ............ H04W 56/0005; H04L 5/0051; H04L 27/2602; H04L 27/261; H04L 5/0044; H04L 5/0083; H04L 5/001; H04L 5/0091; H04L 5/0048; H04L 5/0023; H04L 1/0023; H04L 5/0053; H04L 5/0057
See application file for complete search history.

(56) References Cited

U.S. PATENT DOCUMENTS

| | | | |
|---|---|---|---|
| 2018/0219606 A1 | 8/2018 | Ng et al. | |
| 2018/0270757 A1* | 9/2018 | Ahn | H04W 56/0005 |
| 2018/0343653 A1* | 11/2018 | Guo | H04W 72/542 |
| 2019/0174466 A1* | 6/2019 | Zhang | H04L 5/0057 |

FOREIGN PATENT DOCUMENTS

| | | |
|---|---|---|
| CN | 108024274 A | 5/2018 |
| CN | 108024344 A | 5/2018 |
| CN | 108092754 A | 5/2018 |
| CN | 108199819 A | 6/2018 |
| CN | 108400852 A | 8/2018 |
| WO | 2016033978 A1 | 3/2016 |

OTHER PUBLICATIONS

First Search Report for Chinese Patent Application No. 201811142057.X, dated May 11, 2022 (six (6) pages).
European Search Report for Application No. 19864227.4, dated May 30, 2022 (10 pages).
Ericsson et al., "WF on QCL Indication for DL Physical Channels", 3GPP TSG-RAN WG1 NR Ad Hoc #3, Nagoya, Japan, Sep. 18-21, 2017. R1-1716842.
ZTE et al., "Details and evaluation results on beam indication", 3GPP TSG RAN WG1 Meeting #90-bis, Prague, Czechia, Oct. 9-13, 2017. R1-1717429.
ZTE, "Maintenance for Reference signals and QCL", 3GPP TSG RAN WG1 Meeting #94, Gothenburg, Sweden, Aug. 20-24, 2018. R1-1808197.
International Search Report and Written Opinion for the International Patent Application No. PCT/CN2019/107039, dated Dec. 18, 2019, 3 pages.
ZTE et al. "Remaining details on beam management; R1-1800110" 3GPP TSG RAN WG1 Meeting AH 1801, Jan. 26, 2018.
ZTE. "Maintenance for beam management; R1-1808196" 3GPP TSG RAN WG1 Meeting #94, Aug. 24, 2018.

* cited by examiner

TRANSMISSION CONFIGURATION INDICATION TRANSMISSION METHOD AND DEVICES

This application claims priority to Chinese Patent Application No. 201811142057.X filed with the CNIPA on Sep. 28, 2018, the disclosure of which is incorporated herein by reference in its entirety.

TECHNICAL FIELD

The present disclosure relates to, but is not limited to wireless communication technologies, and specifically relates to an information transmission method and a relevant device.

BACKGROUND

In a wireless communication system, a sending end and a receiving end generally use multiple antennas for sending and reception to obtain a higher rate. One principle of the multiple-input-multiple-output (MIMO) technology is to implement multi-layer transmission which matches channel characteristics by using some channel characteristics, thereby effectively improving system performance. Significant performance improvement is obtained without increasing a bandwidth and power so that the MIMO technology is very promising and is widely used in the system.

The sending end sends a reference signal, and the receiving end calculates channel state information (CSI) by measuring the received reference signal and feeds back the CSI to the sending end through a channel so as to perform precoding or beamforming transmission matching the channel characteristics. To indicate transmission information, a base station uses an identifier (ID) of the reference signal to serve as a quasi-co-location (QCL) source configuration in the configuration of each transmission configuration indication (TCI) and configures a TCI set used as a candidate set of transmission parameters for a terminal (also referred to as a user equipment (UE)). The reference signal may be a periodic, semi-persistent or aperiodic reference signal. For the semi-persistent or aperiodic reference signal, the base station will trigger or activate the transmission of the reference signal by signaling. Every time the base station schedules the transmission of data information, the base station notifies, by signaling, the terminal of a TCI selected from the candidate TCI set or a subset thereof, so that the terminal receives the data information according to transmission parameters indicated by the TCI. Generally speaking, the signaling triggering a transmission of the aperiodic or semi-persistent reference signal and the signaling indicating the TCI are not the same signaling. In addition, since the aperiodic or semi-persistent reference signal may be triggered multiple times at different time, the terminal needs to have a clear understanding of the transmission parameters indicated by the TCI. Moreover, after receiving the signaling triggering the aperiodic or semi-persistent reference signal or receiving the signaling indicating the TCI or receiving the aperiodic or semi-persistent reference signal, the terminal needs some time to process the information so as to perform correct data information reception.

Therefore, to satisfy the need of processing time from the terminal and improve the flexibility and effectiveness of the TCI indication, it is necessary to clearly define the timing relationship between the signaling indicating the TCI, the signaling triggering the reference signal, the transmission of the reference signal, and the transmission of data information associated with the TCI. In the related art, such timing relationship is not clearly defined, and the terminal has the problem of fuzzy understanding or insufficient processing time.

SUMMARY

An information transmission method is provided in the embodiments of the present disclosure. The method includes a terminal receives first signaling and second signaling.

The first signaling is configured for indicating a TCI state, and the second signaling is configured for triggering a first reference signal indicated in the TCI state.

The method further includes the terminal determines, according to the first signaling, a target channel or a target signal scheduled.

The target channel or the target signal scheduled by the first signaling uses QCL information corresponding to the first reference signal transmitted before a first symbol or QCL information corresponding to the second signaling transmitted before a first symbol.

An information transmission method is further provided in the embodiments of the present disclosure. The method includes a step described below.

A base station sends first signaling and second signaling.

The first signaling includes a TCI state, and the second signaling is configured for triggering a first reference signal indicated in the TCI state.

The target channel or the target signal scheduled by the first signaling uses QCL information corresponding to the first reference signal transmitted before a first symbol or QCL information corresponding to the second signaling transmitted before a first symbol.

A terminal is further provided in the embodiments of the present disclosure. The terminal includes a receiving unit and a determination unit.

The receiving unit is configured to receive first signaling and second signaling.

The first signaling includes a TCI state, and the second signaling is configured for triggering a first reference signal indicated in the TCI state.

The determination unit is configured to determine, according to the first signaling, a target channel or a target signal scheduled by the first signaling.

A target channel or a target signal scheduled by the first signaling uses QCL information corresponding to the first reference signal transmitted most recently before a first symbol or QCL information corresponding to the second signaling transmitted.

A base station is further provided in the embodiments of the present disclosure. The base station includes a sending unit.

The sending unit is configured to send first signaling and second signaling.

The first signaling includes a TCI state, and the second signaling is configured for triggering a first reference signal indicated in the TCI state.

A target channel or a target signal scheduled by the first signaling uses QCL information corresponding to the first reference signal transmitted most recently before a first symbol or QCL information corresponding to the second signaling transmitted.

A terminal is further provided in the embodiments of the present disclosure. The terminal includes a memory, a processor, and a computer program stored in the memory and executable by the processor. When the computer program is executed by the processor, the above information transmission method is performed.

A base station is further provided in the embodiments of the present disclosure. The base station includes a memory, a processor, and a computer program stored in the memory and executable by the processor. When the computer program is executed by the processor, the above information transmission method is performed.

A computer-readable storage medium is further provided in the embodiments of the present disclosure. The computer-readable storage medium stores an information processing program. When the information processing program is executed by a processor, the above information transmission method is performed.

Compared with the related art, the embodiments of the present disclosure provide information transmission methods and relevant devices. One of the methods includes: a terminal receiving first signaling and second signaling, where the first signaling is configured for indicating a transmission configuration indication (TCI) state, and the second signaling is configured for triggering a first reference signal indicated in the TCI state; and the terminal determining, according to the first signaling, a target channel or a target signal scheduled by the first signaling, where the target channel or the target signal scheduled by the first signaling uses QCL information corresponding to the first reference signal transmitted before a first symbol or QCL information corresponding to the second signaling transmitted before a first symbol. Thus, the present disclosure can clearly define the timing relationship between at least two of the signaling indicating the TCI state, the signaling triggering the reference signal, the transmission of the reference signal, or the transmission of data or control information associated with the TCI, and can avoid the problem that the terminal has a fuzzy understanding or insufficient processing time.

The object and other advantages of the present application can be achieved and obtained through structures set forth in the description, claims and drawings.

BRIEF DESCRIPTION OF DRAWINGS

The drawings are used to provide a further understanding of the technical solution of the present application and constitute a part of the specification. In conjunction with embodiments of the present application, the drawings are intended to illustrate and not to limit the technical solution of the present application.

DETAILED DESCRIPTION

Figure 1:
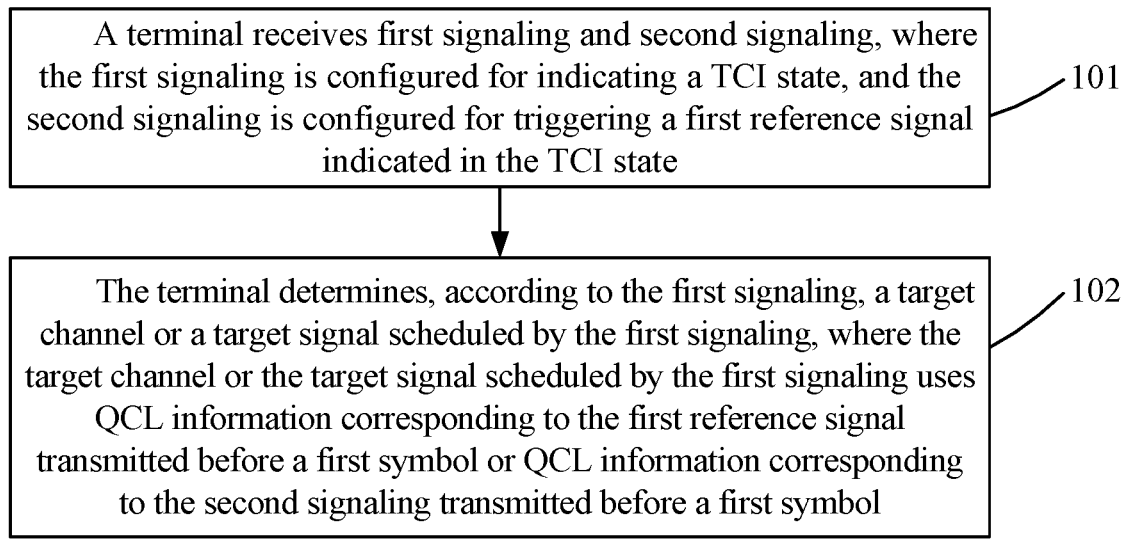
FIG. 1 is a flowchart of an information transmission method according to embodiment one of the present application.

Embodiments of the present application are described hereinafter in detail with reference to the drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

In MIMO wireless communication, a base station will use the method of indicating a transmission configuration indication to improve the performance of information transmission. Specifically, the base station configures a candidate value set of the transmission configuration indication. Each time the information transmission is scheduled, the base station may notify, by signaling, the terminal of a transmission configuration indication selected from the candidate value set or a subset thereof, so that the terminal can receive information according to the transmission configuration indication indicated by the base station. Generally, different transmission configuration indications indicate different channel characteristics. The base station indicates a transmission configuration indication matching channel characteristics, and the terminal can perform information reception matching the channel characteristics. Thus, the performance of information transmission and reception can be improved. One transmission configuration indication includes at least one piece of reference signal resource ID information used as QCL source information, and the reference signal resource ID may indicate a periodic, aperiodic, or semi-persistent reference signal resource. The signaling indicating the TCI and the signaling triggering (or activating) the reference signal resource ID are usually not the same signaling. In addition, after receiving the signaling indicating the TCI, the terminal usually needs some time to perform processing before correctly receiving the data or control information transmission corresponding to the TCI. Thus, to satisfy the need of processing time from the terminal and improve the flexibility and efficiency of the TCI indication, it is necessary to clearly define the timing relationship between the signaling indicating a TCI state, the signaling triggering the reference signal, the transmission of the reference signal, and the transmission of data or control information associated with the TCI. For this reason, a technical solution for information transmission is provided in the embodiments of the present disclosure. The technical solution can clearly define the timing relationship between at least two of the signaling indicating the TCI state, the signaling triggering the reference signal, the transmission of the reference signal, or the transmission of data or control information associated with the TCI, and can avoid the problem that the terminal has a fuzzy understanding or insufficient processing time.

Embodiment One

FIG. 1 is a flowchart of an information transmission method according to embodiment one of the present disclosure. As shown in FIG. 1, the method includes steps described below.

In step 101, a terminal receives first signaling and second signaling, where the first signaling is configured for indicating a TCI state, and the second signaling is configured for triggering a first reference signal indicated in the TCI state.

In step 102, the terminal determines, according to the first signaling, a target channel or a target signal scheduled by the first signaling, where the target channel or the target signal scheduled by the first signaling uses QCL information corresponding to the first reference signal transmitted before a first symbol or QCL information corresponding to the second signaling transmitted before a first symbol.

The target channel or the target signal is at least one of: a data channel, a second reference signal, or a control channel.

The QCL information also refers to a corresponding large-scale channel parameter, and the large-scale channel parameter includes at least one of: Doppler shift, Doppler spread, delay spread, average delay, a spatial receiving parameter, or an average gain. The TCI state also refers to the reference signal information about QCL of the target channel or signal or a demodulation reference signal of a target channel with respect to at least one of the above large-scale channel parameters.

The first reference signal or second signaling transmitted before the first symbol refers to that the last symbol of the first reference signal or the second signaling is before the first symbol.

The first symbol is at least one of: a first time domain symbol occupied by the first signaling; a first time domain symbol occupied by the physical channel where the first signaling is located; the N1-th time domain symbol before the target channel or signal scheduled by the first signaling; the N2-th time domain symbol before the first signaling; or the N2-th time domain symbol before the physical channel where the first signaling is located.

The target channel or the target signal scheduled by the first signaling uses QCL information corresponding to the second signaling or the first reference signal transmitted most recently before a first symbol. Alternatively, the terminal itself decides to use QCL information corresponding to the second signaling or the first reference signal transmitted some time before the first symbol, instead of being limited to QCL information corresponding to the second signaling or the first reference signal transmitted most recently before the first symbol.

At least M1 time domain symbols are spaced between the first symbol and the first reference signal transmitted most recently before the first symbol.

At least M2 time domain symbols are spaced between the target channel or the target signal scheduled by the first signaling and the first reference signal transmitted most recently before the first symbol.

In a case where a trigger delay of the first reference signal transmitted most recently before the first symbol is greater than or equal to a threshold K, the target channel or the target signal scheduled by the first signaling uses the QCL information corresponding to the first reference signal transmitted most recently before the first symbol.

The trigger delay is the number of time domain symbols between the second signaling and transmission of the first reference signal triggered by the second signaling.

In a case where a trigger delay of the first reference signal transmitted most recently before the first symbol is less than a threshold K and the number of symbols between a first symbol of the target channel or the target signal scheduled by the first signaling and the second signaling is greater than K, the target channel or the target signal scheduled by the first signaling uses the QCL information corresponding to the second signaling transmitted most recently before the first symbol.

The trigger delay is the number of time domain symbols between the second signaling and transmission of the first reference signal triggered by the second signaling.

The threshold K is the number of time domain symbols required by a terminal and between the first signaling and a channel or a signal using the TCI state included in the first signaling.

The target channel or the target signal scheduled by the first signaling uses QCL information used by a first reference signal corresponding to a CSI report transmitted most recently before the first symbol.

The method further includes that the terminal reports at least one of: information about the number of symbols required by the terminal and between the first signaling scheduling the target channel or the target signal and the second signaling triggering the first reference signal indicated in the TCI state most recently before the first signaling; information about the number of symbols required by the terminal and between the target channel or the target signal scheduled by the first signaling and the second signaling transmitted most recently before the target channel or the target signal; the number of symbols required by the terminal and between the first reference signal transmitted most recently before the first signaling and the first signaling; or the number of symbols required by the terminal and between the target channel or the target signal scheduled by the first signaling and the first reference signal transmitted most recently before the target channel or the target signal.

It is to be noted that the method of reporting at least one of the above pieces of information by the terminal may be used in combination with the above method or may be used independently, that is, the method of reporting the capability-related information by the terminal may be used independently of other methods proposed in the present application.

The method further includes that the terminal determines a value of at least one of M1, M2, N1, or N2 in at least one of the manners described below.

Manner one: The value is determined according to a preset value.

Manner two: The value is determined according to capability information of the terminal. The capability information includes at least one of: a threshold K; the number B of times the terminal is capable of changing a spatial QCL parameter within one slot; the number of symbols required by the terminal and between signaling scheduling an uplink transmission and the scheduled uplink transmission; the number of symbols required by the terminal and between the second signaling triggering the first reference signal and transmission of the first reference signal; or the number of symbols required by the terminal and from a transmission of the first reference signal to reporting of CSI corresponding to the first reference signal.

Manner three: The value is determined according to configuration information of a reference signal set where a first reference signal resource is located or a first reference signal resource, and such determination includes at least one of: determination according to whether the reference signal set where the first reference signal resource is located is configured with repeat indication information; or determination according to the number of resources included in the reference signal set where the first reference signal resource is located.

Manner four: The value is determined according to a QCL category included in the TCI state in the first signaling.

Manner five: The value is determined according to whether the first signaling and the second signaling are from a same serving cell.

The first signaling and the second signaling are from a same serving cell.

The first signaling, the second signaling, and the target channel or the target signal scheduled by the first signaling are in a same serving cell.

The first signaling, the second signaling, the first reference signal triggered by the second signaling, and the target channel or the target signal scheduled by the first signaling are in a same serving cell.

At least two of the first signaling, the second signaling, the first reference signal triggered by the second signaling, or the target channel or the target signal scheduled by the first signaling are from different serving cells, and the first reference signal triggered by the second signaling, the target channel or the target signal scheduled by the first signaling, and/or a control channel where signaling is located correspond to same subcarrier spacing.

Embodiment Two

Figure 2:
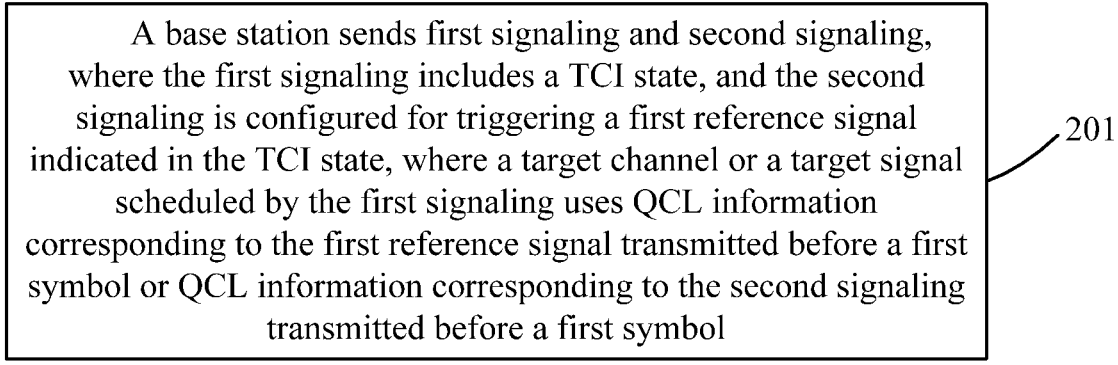
FIG. 2 is a flowchart of an information transmission method according to embodiment two of the present application.

FIG. 2 is a flowchart of an information transmission method according to embodiment two of the present disclosure. As shown in FIG. 2, the method includes steps described below.

In step 201, a base station sends first signaling and second signaling, where the first signaling includes a TCI state, and the second signaling is configured for triggering a first reference signal indicated in the TCI state, where a target channel or a target signal scheduled by the first signaling uses QCL information corresponding to the first reference signal transmitted before a first symbol or QCL information corresponding to the second signaling transmitted before a first symbol.

The target channel or the target signal is at least one of: a data channel, a second reference signal, or a control channel.

The QCL information also refers to a corresponding large-scale channel parameter, and the large-scale channel parameter includes at least one of: Doppler shift, Doppler spread, delay spread, average delay, a spatial receiving parameter, or an average gain. The TCI state also refers to the reference signal information about QCL of the target channel or signal or a demodulation reference signal of a target channel with respect to at least one of the above large-scale channel parameters.

The first reference signal or second signaling transmitted before the first symbol refers to that the last symbol of the first reference signal or the second signaling is before the first symbol.

The first symbol is at least one of: a first time domain symbol occupied by the first signaling; a first time domain symbol occupied by the physical channel where the first signaling is located; the N1-th time domain symbol before the target channel or signal scheduled by the first signaling; the N2-th time domain symbol before the first signaling; or the N2-th time domain symbol before the physical channel where the first signaling is located.

The target channel or the target signal scheduled by the first signaling uses QCL information corresponding to the second signaling or the first reference signal transmitted most recently before a first symbol. Alternatively, the terminal itself decides to use QCL information corresponding to the second signaling or the first reference signal transmitted some time before the first symbol, instead of being limited to QCL information corresponding to the second signaling or the first reference signal transmitted most recently before the first symbol.

At least M1 time domain symbols are spaced between the first symbol and the first reference signal transmitted most recently before the first symbol.

At least M2 time domain symbols are spaced between the target channel or the target signal scheduled by the first signaling and the first reference signal transmitted most recently before the first symbol.

In a case where a trigger delay of the first reference signal transmitted most recently before the first symbol is greater than or equal to a threshold K, the target channel or the target signal scheduled by the first signaling uses the QCL information corresponding to the first reference signal transmitted most recently before the first symbol.

The trigger delay is the number of time domain symbols between the second signaling and transmission of the first reference signal triggered by the second signaling.

In a case where a trigger delay of the first reference signal transmitted most recently before the first symbol is less than a threshold K and the number of symbols between a first symbol of the target channel or the target signal scheduled by the first signaling and the second signaling is greater than K, the target channel or the target signal scheduled by the first signaling uses the QCL information corresponding to the second signaling transmitted most recently before the first symbol.

The trigger delay is the number of time domain symbols between the second signaling and transmission of the first reference signal triggered by the second signaling.

The threshold K is the number of time domain symbols required by a terminal and between the first signaling and a channel or a signal using the TCI state included in the first signaling.

The target channel or the target signal scheduled by the first signaling uses QCL information used by a first reference signal corresponding to a CSI report transmitted most recently before the first symbol.

The method further includes that the base station receives at least one of the following pieces of information reported by the terminal: information about the number of symbols required by the terminal and between the first signaling scheduling the target channel or the target signal and the second signaling triggering the first reference signal indicated in the TCI most recently before the first signaling; information about the number of symbols required by the terminal and between the target channel or the target signal scheduled by the first signaling and the second signaling transmitted most recently before the target channel or the target signal; the number of symbols required by the terminal and between the first reference signal transmitted most recently before the first signaling and the first signaling; or the number of symbols required by the terminal and between the target channel or the target signal scheduled by the first signaling and the first reference signal transmitted most recently before the target channel or the target signal.

It is to be noted that the method of the base station receiving at least one of the above pieces of information reported by the terminal may be used in combination with the above method or may be used independently, that is, the method of the base station receiving the capability-related information reported by the terminal may be used independently of other methods proposed in the present application.

The method further includes that the base station determines a value of at least one of M1, M2, N1, or N2 in at least one of the manners described below.

Manner one: The value is determined according to a preset value.

Manner two: The value is determined according to capability information reported by the terminal. The capability information includes at least one of: a threshold K; the number of times the terminal is capable of changing a spatial QCL parameter within one slot; the number of symbols required by the terminal and between signaling scheduling an uplink transmission and the scheduled uplink transmission; the number of symbols required by the terminal and between the second signaling triggering the first reference signal and transmission of the first reference signal; or the number of symbols required by the terminal and from a transmission of the first reference signal to reporting of CSI corresponding to the first reference signal.

Manner three: The value is determined according to configuration information of a reference signal set where a first reference signal resource is located or a first reference signal resource, and such determination specifically includes at least one of: determination according to whether the reference signal set where the first reference signal resource is located is configured with repeat indication information; or determination according to the number of resources included in the reference signal set where the first reference signal resource is located.

Manner four: The value is determined according to a QCL category included in the TCI state in the first signaling.

Manner five: The value is determined according to whether the first signaling and the second signaling are from a same serving cell.

The first signaling and the second signaling are from a same serving cell.

The first signaling, the second signaling, and the target channel or the target signal scheduled by the first signaling are in a same serving cell.

The first signaling, the second signaling, the first reference signal triggered by the second signaling, and the target channel or the target signal scheduled by the first signaling are in a same serving cell.

At least two of the first signaling, the second signaling, the first reference signal triggered by the second signaling, or the target channel or the target signal scheduled by the first signaling are from different serving cells, and the first reference signal triggered by the second signaling, the target channel or the target signal scheduled by the first signaling, and/or a control channel where signaling is located correspond to same subcarrier spacing.

The technical schemes provided in embodiments one and two simply and clearly define the timing relationship between at least two of the first signaling, the second signaling, the target channel or the target signal scheduled by the first signaling, or the reference signal triggered by the second signaling, solving the problem that the terminal has a fuzzy understanding or insufficient processing capability.

The technical schemes provided in embodiments one and two are described in detail below through five examples.

Example One

Figure 3:
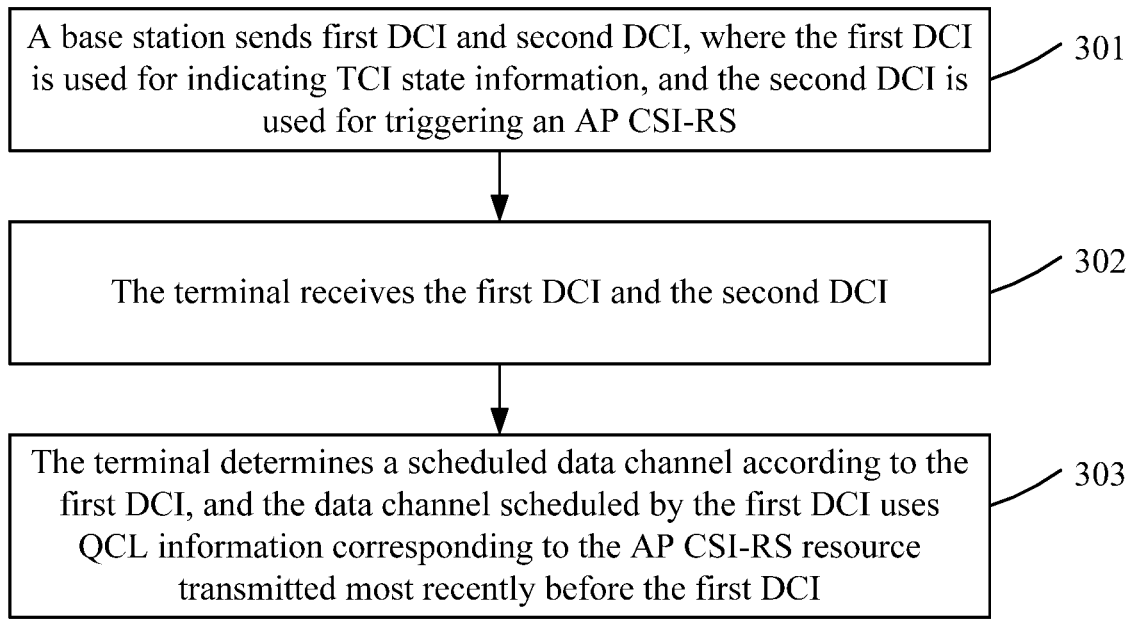
FIG. 3 is a flowchart of an information transmission method according to example one of the present application.

FIG. 3 is a flowchart of an information transmission method according to example one of the present application. As shown in FIG. 3, the method includes steps described below.

In step 301, a base station sends first downlink control information (DCI) and second DCI, where the first DCI is used for indicating TCI state information, and the second DCI is used for triggering an aperiodic (AP) channel state information-reference signal (CSI-RS).

In example one, signaling may be in a form of DCI signaling. That is, first signaling and second signaling are the first DCI and the second DCI in this example, respectively.

In TCI state information indicated by a base station for a terminal, the reference signal indicating a QCL parameter may be an aperiodic CSI-RS (i.e., a first reference signal). QCL information of the aperiodic CSI-RS may be indicated by DCI signaling triggering the CSI-RS.

Specifically, for a resource of the aperiodic CSI-RS, different QCL parameter information may be configured for the trigger states of the CSI-RS. An example of such configuration is provided in Table 1.

TABLE 1

| CSI-RS trigger state configuration | | |
|---|---|---|
| CSI trigger state | ID of a resource in a reference signal resource set | QCL information |
| Trigger state (TS) 1 | AP CSI-RS resource 0 | CSI-RS 1 |
| TS 2 | AP CSI-RS resource 0 | CSI-RS 2 |

As shown in Table 1, different CSI trigger states are associated with different DCI state bits. For example, in a CSI request domain in DCI, if 01 is indicated, the reference signal resource set corresponding to TS 1 is triggered; and if 10 is indicated, the reference signal resource set corresponding to TS 2 is triggered. In addition, TS 1 and TS 2 include a same CSI-RS resource, AP CSI-RS resource 0, but correspond to different QCL information. The QCL source of CSI-RS resource 0 configured in TS 1 is CSI-RS resource 1, and the QCL source of CSI-RS resource 0 configured in TS 2 is CSI-RS resource 2. Therefore, the QCL parameter of the AP CSI-RS may be changed through DCI triggering the CSI-RS. On the other hand, when the base station schedules data transmission, the DCI scheduling the data may indicate TCI information of the data transmission, and QCL information included in the TCI may be an AP CSI-RS. When acquiring corresponding QCL information through the AP CSI-RS, the terminal needs to acquire a final QCL channel parameter through QCL information corresponding to the AP CSI-RS. The DCI indicating the TCI information of the data is referred to as the first DCI, and the DCI triggering the AP CSI-RS is referred to as the second DCI.

In step 302, the terminal receives the first DCI and the second DCI.

In step 303, the terminal determines a scheduled data channel according to the first DCI, and the data channel scheduled by the first DCI uses QCL information corresponding to the AP CSI-RS resource transmitted most recently before the first DCI.

When the TCI indicated by the first DCI is an AP CSI-RS resource, the data channel scheduled by the first DCI uses the QCL information corresponding to the AP CSI-RS resource transmitted most recently before the first DCI. In other words, a data channel demodulation reference signal (DMRS) scheduled by the first DCI and the AP CSI-RS transmitted most recently before the first DCI are QCL.

In another possible example, the terminal itself may decide to use QCL information corresponding to the AP CSI-RS resource transmitted some time before the first DCI, instead of being limited to the QCL information corresponding to the AP CSI-RS resource transmitted most recently before the first DCI.

Figure 4:
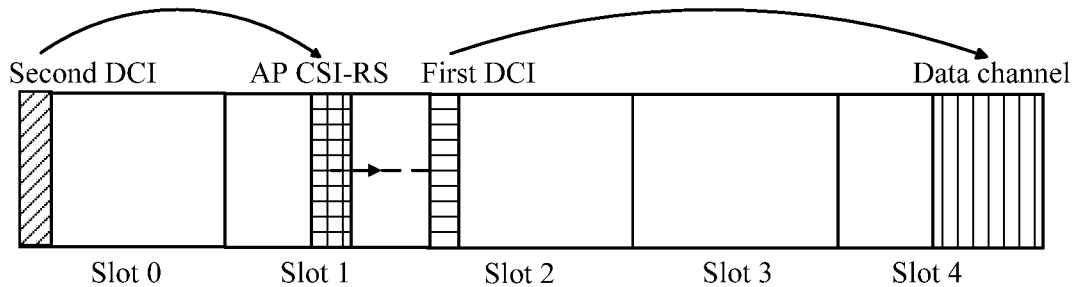
FIG. 4 is a schematic diagram of a timing relationship between signaling according to example one of the present application.

As shown in FIG. 4, in example one, it can be ensured that the AP CSI-RS is transmitted before the first DCI. The "most recently" enables the terminal to correctly understand QCL information corresponding to the AP CSI-RS, and the QCL information can be updated by using the latest AP CSI-RS transmission.

Optionally, if the trigger delay of the AP CSI-RS resource transmitted most recently before the first DCI is greater than or equal to a threshold K, the data channel scheduled by the first DCI uses QCL information of the AP CSI-RS resource transmitted most recently before the first DCI; if the trigger delay of the AP CSI-RS transmitted most recently before the first DCI is less than the threshold K and the number of symbols from the first symbol of the data channel scheduled by the first DCI to the second DCI is greater than K, the data channel scheduled by the first DCI uses QCL information of the AP CSI-RS indicated by the second DCI.

The trigger delay of the AP CSI-RS resource is the number of time domain symbols between the second DCI and the AP CSI-RS.

The threshold K is a threshold configured by the base station or a threshold determined according to the capability of the UE, for example, K denotes the number of time domain symbols required by the terminal and between DCI and the channel or signal using the TCI state in order to use the TCI state notified by the DCI.

Optionally, at least M1 time domain symbols are spaced between the first DCI and the AP CSI-RS transmitted most recently before the first DCI.

The value of M1 may be determined according to a preset rule, for example, is a fixed value. Alternatively, the value of M1 is determined according to the capability of the terminal, for example, according to the threshold K. Alternatively, the value of M1 is determined according to the number of times the terminal can switch beams in one slot; for example, if the number of times is B, the value of M1 is at least greater than or equal to $$\left\lceil \frac{N_{slot}^{symbol}}{B} \right\rceil,$$

where $N_{slot}^{symbol}$ denotes the number of time domain symbols in one slot, for example, 14. Alternatively, the value of M1 is determined according to the number of symbols required by the terminal and from a CSI-RS to reporting of a CSI-RS resource indication (CRI)/Layer-1 reference signal receive power (L1-RSRP).

Optionally, at least M2 symbols are spaced between the data channel scheduled by the first DCI and the AP CSI-RS transmitted most recently before the first DCI.

The value of M2 may be determined according to a preset rule, for example, is a fixed value. Alternatively, the value of M2 is determined according to the capability of the terminal, for example, according to the threshold K; specifically, the value is K or the value is K plus a preset value or a capability value of the terminal. Alternatively, the value of M2 is determined according to the number of times the terminal can switch beams in one slot; for example, if the number of times is B, the value of M2 is at least greater than or equal to $$\left\lceil \frac{N_{slot}^{symbol}}{B} \right\rceil,$$

where $N_{slot}^{symbol}$ denotes the number of time domain symbols in one slot, for example, 14. Alternatively, the value of M2 is determined according to the number of symbols required by the terminal and required from a CSI-RS to reporting of a CRI/L1-RSRP. Alternatively, the value of M2 is determined according to a QCL category included in the TCI in the first DCI; for example, if the QCL category includes a spatial receiving parameter, the value of M2 is a first preset value or a first terminal capability value, and if the QCL category does not include a spatial receiving parameter, the value of M2 is a second preset value or a second terminal capability value. Optionally, the first DCI and the second DCI are from a same serving cell.

Optionally, the first DCI, the second DCI, and the data channel scheduled by the first DCI are in a same serving cell.

Optionally, the first DCI, the second DCI, the AP CSI-RS triggered by the second DCI, and the data channel scheduled by the first DCI are in a same serving cell.

Optionally, when at least two of the first DCI, the second DCI, the AP CSI-RS triggered by the second DCI, or the data channel scheduled by the first DCI are from different serving cells, the corresponding CSI-RS and the corresponding data channel and/or control channel correspond to same subcarrier spacing.

Optionally, the required value of M1 or M2 when the first DCI and the second DCI are from different serving cells is different from the required value of M1 or M2 when the first DCI and the second DCI are from a same serving cell.

The serving cell may also be referred to as a component carrier (CC).

Example Two

In example two, the first DCI and the second DCI are defined as described in example one.

Example two differs from example one in that when the TCI state indicated by the first DCI is an AP CSI-RS resource, the data channel scheduled by the first DCI uses QCL information corresponding to the AP CSI-RS transmitted most recently before a first symbol. In other words, a data channel DMRS scheduled by the first DCI and the AP CSI-RS transmitted most recently before the first symbol are QCL.

The first symbol may be in one of the manners described below.

Manner one: The N1-th symbol before the data channel scheduled by the first DCI is the first symbol. In other words, if the first symbol of the data channel scheduled by the first DCI is symbol n, the first symbol is symbol (n−N1).

Manner two: The first symbol of the first DCI is the first symbol.

Manner three: The N2-th symbol before the first DCI is the first symbol. In other words, if the first symbol of the first DCI is symbol n, the first symbol is symbol (n−N2).

In manner two, when the first symbol is the first symbol of the first DCI, the data channel scheduled by the first DCI uses the QCL information corresponding to the AP CSI-RS resource transmitted most recently before the first DCI, as described in example one.

Figure 5:
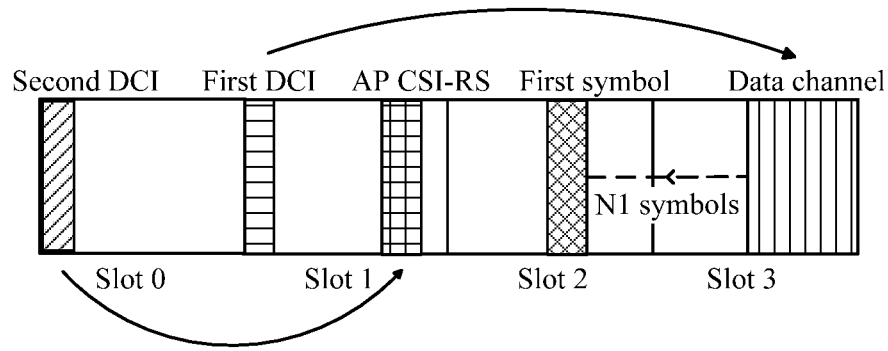
FIG. 5 is a schematic diagram of a timing relationship between signaling according to example two of the present application.

One example of manner one is shown in FIG. 5. For manner one and manner three, when QCL information corresponding to the AP CSI-RS is used by the terminal, leaving N1 or N2 symbols is helpful for the terminal to receive data information by using corresponding channel characteristics after the terminal processes the AP CSI-RS to some extent, thus improving data receiving performance and reducing complexity of the terminal. Compared with that in manner two, the AP CSI-RS has fewer sending position restrictions and higher flexibility.

In another possible example, the terminal itself decides to use QCL information corresponding to the AP CSI-RS resource transmitted some time before the first symbol, instead of being limited to QCL information corresponding to the AP CSI-RS resource transmitted most recently before the first symbol.

Optionally, if the trigger delay of the AP CSI-RS resource transmitted most recently before the first symbol is greater than or equal to the threshold K, the data channel scheduled by the first DCI uses the QCL information of the AP CSI-RS resource transmitted most recently before the first symbol. If the trigger delay of the AP CSI-RS transmitted most recently before the first symbol is less than the threshold K and the number of symbols from the first symbol of the data channel scheduled by the first DCI to the second DCI is greater than K, the data channel scheduled by the first DCI uses the QCL information of the AP CSI-RS indicated by the second DCI.

The trigger delay of the AP CSI-RS resource is the number of time domain symbols between the second DCI and the AP CSI-RS. The threshold K is a threshold configured by the base station or a threshold determined according to the capability of the UE; for example, K denotes the number of time domain symbols required by the terminal and between DCI and the channel or signal using the TCI state in order to use the TCI state notified by the DCI.

The value of N1 in manner one may be determined in at least one of the manners described below.

Manner A1: The value of N1 is determined by configuration information of a CSI-RS resource set where a CSI-RS resource is located or the CSI-RS resource; for example, N1 is determined according to whether the CSI-RS resource set where the CSI-RS resource is located is configured with a repeat indication parameter, or N1 is determined according to the number of CSI-RS resources included in the CSI-RS resource set where the CSI-RS is located.

Manner A2: The value of N1 is determined in a preset manner, for example, the value of N1 is a fixed value.

Manner A3: The value of N1 is determined according to capability information of the terminal. For example, the terminal reports the required number of symbols between the latest AP CSI-RS transmission before the first symbol and the data channel scheduled by the first DCI.

The value of N1 may also be determined through other capability information reported by the terminal.

Specifically, the value of N1 may be determined according to a first capability value which is one of the capability values described below.

1. The value of N1 is determined according to the threshold K; for example, the value of N1 is K or is K plus a preset value or a capability value of the terminal.

2. The value of N1 is determined according to the number of times the terminal can switch beams in one slot; for example, if the number of times is B, the value of N1 is at least greater than or equal to $$\left\lceil \frac{N_{slot}^{symbol}}{B} \right\rceil,$$

where $N_{slot}^{symbol}$ denotes the number of time domain symbols in one slot, for example, 14.3. The value of N1 is determined according to the number of symbols required by the terminal and from transmission of the CSI-RS to reporting of the corresponding CRI/L1-RSRP.

Optionally, the value of N1 is the larger one of the number of symbols obtained according to the first capability value and another preset value N3.

Optionally, the value of N1 is the sum of the number of symbols obtained according to the first capability value and another preset value N4.

Optionally, the value of N1 is determined according to a QCL category included in the TCI in the first DCI; for example, if the QCL category includes a spatial receiving parameter, the value of N1 is a first preset value or a terminal capability value, and if the QCL category does not include a spatial receiving parameter, the value of N1 is a second preset value or a terminal capability value.

The value of N2 in manner three may be determined in at least one of the manners described below.

Manner B1: The value of N2 is determined by configuration information of a CSI-RS resource set where a CSI-RS resource is located or the CSI-RS resource; for example, N2 is determined according to whether the CSI-RS resource set where the CSI-RS resource is located is configured with a repeat indication parameter, or N2 is determined according to the number of CSI-RS resources included in the CSI-RS resource set where the CSI-RS is located.

Manner B2: The value of N2 is determined in a preset manner, for example, the value of N2 is a fixed value.

Manner B3: The value of N2 is determined according to capability information of the terminal. For example, the terminal reports the required number of symbols between the current AP CSI-RS transmission and the first DCI.

The value of N2 may also be determined through other capability information reported by the terminal.

Specifically, the value of N2 may be determined according to a second capability value which is one of the capability values described below.

1. The value of N2 is determined according to the threshold K; for example, the value of N2 is K or is K plus a preset value or a capability value of the terminal.

2. The value of N2 is determined according to the number of times the terminal can switch beams in one slot; for example, if the number of times is B, the value of N2 is at least greater than or equal to $$\left\lceil \frac{N_{slot}^{symbol}}{B} \right\rceil,$$

where $N_{slot}^{symbol}$ denotes the number of time domain symbols in one slot, for example, 14.3. The value of N2 is determined according to the number of symbols required by the terminal and from the CSI-RS to reporting of the CRI/L1-RSRP.

Optionally, the value of N2 is the larger one of the number of symbols obtained according to the second capability value and another preset value N5.

Optionally, the value of N2 is the sum of the number of symbols obtained according to the second capability value and another preset value N6.

Optionally, the value of N2 is determined according to a QCL category included in the TCI in the first DCI; for example, if the QCL category includes a spatial receiving parameter, the value of N2 is a third preset value or a terminal capability value, and if the QCL category does not include a spatial receiving parameter, the value of N2 is a fourth preset value or a terminal capability value.

Optionally, the first DCI and the second DCI are from a same serving cell.

Optionally, the first DCI, the second DCI, and the data channel scheduled by the first DCI are in a same serving cell.

Optionally, the first DCI, the second DCI, the AP CSI-RS triggered by the second DCI, and the data channel scheduled by the first DCI are in a same serving cell.

Optionally, when at least two of the first DCI, the second DCI, the AP CSI-RS triggered by the second DCI, and the data channel scheduled by the first DCI are from different serving cells, the corresponding CSI-RS and the corresponding data channel and/or control channel correspond to same subcarrier spacing.

Optionally, the required value of N1 or N2 when the first DCI and the second DCI are from different serving cells is different from the required value of N1 or N2 when the first DCI and the second DCI are from a same serving cell.

The serving cell may also be referred to as a CC.

Example Three

In example three, the first DCI and the second DCI are defined as described in example one.

Example three differs from example one in that when the TCI state indicated by the first DCI is an AP CSI-RS resource, the data channel scheduled by the first DCI uses QCL information indicated in the second DCI triggering the AP CSI-RS most recently before a second symbol. In other words, a data channel DMRS scheduled by the first DCI uses the QCL information indicated in the second DCI triggering the AP CSI-RS most recently before the second symbol.

The second symbol may be in at least one of the manners described below.

Manner one: The S1-th symbol before the data channel scheduled by the first DCI is the second symbol; in other words, if the first symbol of the data channel scheduled by the first DCI is symbol n, the second symbol is symbol (n−S1).

Manner two: The first symbol of the first DCI is the second symbol.

Manner three: The S2-th symbol before the first DCI is the second symbol; in other words, if the first symbol of the first DCI is symbol n, the second symbol is symbol (n−S2).

Figure 6:
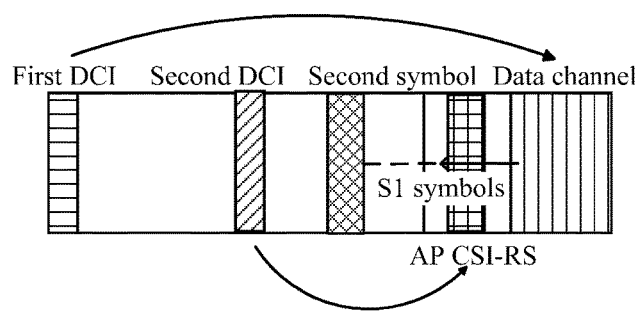
FIG. 6 is a schematic diagram of a timing relationship between signaling according to example three of the present application.

One example of manner one is shown in FIG. 6.

According to the scheme of example three, the final QCL information of the data channel is determined according to the QCL information indicated by the second DCI. The scheme can provide sufficient time for the terminal to obtain the QCL information. For example, through an analysis of the second DCI, the problem that the terminal has a fuzzy understanding of a QCL parameter of the AP CSI-RS can also be solved. Compared with those in example one and example two, the second DCI and the AP CSI-RS have fewer sending position restrictions and higher flexibility.

In another possible example, the terminal itself may decide to use QCL information corresponding to the AP CSI-RS resource transmitted some time before the second symbol, instead of being limited to QCL information corresponding to the AP CSI-RS resource transmitted most recently before the second symbol.

The value of S1 in manner one may be determined in at least one of the manners described below.

Manner C1: S1 is a preset value, for example, S1 is a fixed value.

Manner C2: S1 is determined according to capability information of the terminal. For example, the terminal reports information about the number of symbols required by the terminal and between the data channel scheduled by the first DCI and the second DCI.

Optionally, the value of S1 may be determined through other capability information reported by the terminal. For example, S1 may be determined according to at least one of the following pieces of capability information:
1. the number of time domain symbols required by the terminal and between the DCI indicating the TCI and the channel or signal using the TCI state;
2. the number B of times the terminal can change a spatial QCL parameter in one slot; for example, the value of S1 is at least greater than or equal to $$\left\lceil \frac{N_{slot}^{symbol}}{B} \right\rceil,$$

where $N_{slot}^{symbol}$ denotes the number of time domain symbols in one slot, for example, 14;
3. the number of symbols required by the terminal and between DCI scheduling an uplink transmission and the scheduled uplink transmission;
4. the number of symbols required by the terminal and from the DCI triggering the AP CSI-RS to transmission of the AP CSI-RS; or
5. the number of symbols required by the terminal and from transmission of the CSI-RS to reporting of the corresponding CRI/L1-RSRP.

Optionally, the value of S1 is determined according to the sum of at least two pieces of information among the above capability information. For example, the value of S1 is determined according to the sum of the number of symbols required by the terminal and from the DCI triggering the AP CSI-RS to transmission of the AP CSI-RS and the number of symbols required by the terminal and from transmission of the CSI-RS to reporting of the corresponding CRI/L1-RSRP.

Optionally, the value of S1 is determined according to the larger one of one piece of information among the above capability information and another preset value S3.

Optionally, the value of S1 is determined according to the sum of one piece of information among the above capability information and another preset value S4.

Optionally, the value of S1 is determined according to a QCL category included in the TCI in the first DCI; for example, if the QCL category includes a spatial receiving parameter, the value of S1 is a preset value or a terminal capability value, and if the QCL category does not include a spatial receiving parameter, the value of S1 is another preset value or another terminal capability value.

The value of S2 in manner three may be determined in at least one of the manners described below.

Manner D1: S2 is a preset value, for example, S2 is a fixed value.

Manner D2: S2 is determined according to capability information of the terminal. For example, the terminal reports information about the number of symbols required by the terminal and between the first DCI scheduling the data channel and the second DCI triggering the AP CSI-RS in the TCI.

Optionally, the value of S2 may be determined through other capability information reported by the terminal. For example, S2 may be determined according to at least one of the following pieces of capability information:

1. the number of time domain symbols required by the terminal and between the DCI indicating the TCI and the channel or signal using the TCI state;
2. the number B of times the terminal can change a spatial QCL parameter in one slot; for example, the value of S2 is at least greater than or equal to $$\left\lceil \frac{N_{slot}^{symbol}}{B} \right\rceil,$$

where $N_{slot}^{symbol}$ denotes the number of time domain symbols in one slot, for example, 14; 3. the number of symbols required by the terminal and between DCI scheduling an uplink transmission and the scheduled uplink transmission;
4. the number of symbols required by the terminal and from the DCI triggering the AP CSI-RS to transmission of the AP CSI-RS; or
5. the number of symbols required by the terminal and from transmission of the CSI-RS to reporting of the corresponding CRI/L1-RSRP.

Optionally, the value of S2 is determined according to the sum of at least two pieces of information among the above capability information. For example, the value of S2 is determined according to the sum of the number of symbols required by the terminal and from the DCI triggering the AP CSI-RS to transmission of the AP CSI-RS and the number of symbols required by the terminal and from transmission of the CSI-RS to reporting of the corresponding CRI/L1-RSRP.

Optionally, the value of S2 is determined according to the larger one of one piece of information among the above capability information and another preset value S5.

Optionally, the value of S2 is determined according to the sum of one piece of information among the above capability information and another preset value S6.

Optionally, the value of S2 is determined according to the QCL category included in the TCI in the first DCI. For example, if the QCL category includes a spatial receiving parameter, the value of S2 is a preset value or a terminal capability value, and if the QCL category does not include a spatial receiving parameter, the value of S2 is another preset value or another terminal capability value.

Optionally, the first DCI and the second DCI are from a same serving cell.

Optionally, the first DCI, the second DCI, and the data channel scheduled by the first DCI are in a same serving cell.

Optionally, the first DCI, the second DCI, the AP CSI-RS triggered by the second DCI, and the data channel scheduled by the first DCI are in a same serving cell.

Optionally, when at least two of the first DCI, the second DCI, the AP CSI-RS triggered by the second DCI, or the data channel scheduled by the first DCI are from different serving cells, the corresponding CSI-RS and the corresponding data channel and/or control channel correspond to same subcarrier spacing.

Optionally, the required value of S1 or S2 when the first DCI and the second DCI are from different serving cells is different from the required value of S1 or S2 when the first DCI and the second DCI are from a same serving cell.

The serving cell may also be referred to as a CC.

Example Four

In example four, the first DCI and the second DCI are defined as described in example one.

Figure 7:
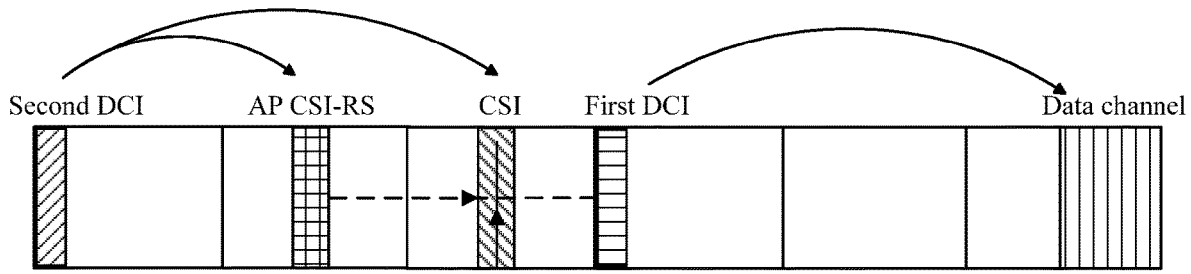
FIG. 7 is a schematic diagram of a timing relationship between signaling according to example four of the present application.

Example four differs from example one in that when the TCI state indicated by the first DCI is an AP CSI-RS resource, the QCL information used by the data channel scheduled by the first DCI is QCL information corresponding to a CSI report associated with the AP CSI-RS and most recently transmitted before the first DCI. In other words, a data channel DMRS scheduled by the first DCI and the AP CSI-RS corresponding to the CSI report using the AP CSI-RS and transmitted most recently before the first DCI are QCL, as shown in FIG. 7.

The CSI report may be a CRI/L1-RSRP report or a CRI/rank indicator (RI)/precoding matrix indicator (PMI)/channel quality indicator (CQI) report.

Example Five

In example five, in the TCI state information indicated by the base station for the terminal, the reference signal indicating the QCL parameter may also be a semi-persistent (SP) CSI-RS (i.e., the first reference signal) activated by a media access control (MAC) control element (CE). QCL information of the SP CSI-RS may be indicated by the MAC signaling triggering the SP CSI-RS.

Example five differs from examples one to four in that the SP CSI-RS may replace the AP CSI-RS indicated by the TCI in the first DCI, and first MAC signaling activating the SP CSI-RS may replace the second DCI triggering the AP CSI-RS. After the above replacement, methods in example four are applicable to the case where the SP CSI-RS is indicated as a data channel QCL source.

Optionally, in example five, the number of symbols involved (for example, the value of a parameter such as M1, M2, N1, N2, S1 or S2) may be the original number of symbols in examples one to four plus the number of symbols from hybrid automatic request and repeat-acknowledge information corresponding to the data channel bearing the MAC CE to validation of activation signaling corresponding to the MAC CE.

In the technical scheme provided in examples 1 to 5, N1 and S1 correspond to N1 in embodiment one, and N2 and S2 correspond to N2 in embodiment one.

Example Six

Example six differs from examples one to five in that the first DCI may schedule not only a data channel but also another target channel or signal such as a second reference signal (second CSI-RS) and a control channel.

In a specific implementation, a second CSI-RS or control channel of the QCL information corresponding to the second signaling or corresponding to the first reference signal transmitted most recently before the first symbol indicated in the TCI state in the first DCI may replace the data channel of the QCL information corresponding to the second signaling or corresponding to the first reference signal transmitted most recently before the first symbol indicated in the TCI state in the first DCI. More specifically, the second CSI-RS may be further described as a CSI-RS triggered by the first DCI or activated by second MAC CE signaling.

For example, in a specific example, when the TCI state indicated by the first DCI is an AP CSI-RS resource, the second CSI-RS scheduled by the first DCI uses QCL information corresponding to the AP CSI-RS transmitted most recently before the first symbol. On the other hand, the second CSI-RS scheduled by the first DCI and the AP CSI-RS transmitted most recently before the first symbol are QCL. Here, the first DCI is DCI scheduling the second CSI-RS.

The first symbol may be in one of the manners described below.

Manner one: The N1-th symbol before the second CSI-RS scheduled by the first DCI is the first symbol. In other words, if the first symbol of the second CSI-RS scheduled by the first DCI is symbol n, the first symbol is symbol (n−N1).

Manner two: The first symbol of the first DCI is the first symbol.

Manner three: The N2-th symbol before the first DCI is the first symbol. In other words, if the first symbol of the first DCI is symbol n, the first symbol is symbol (n−N2).

In another possible example, when the TCI state indicated by the first MAC CE is an AP CSI-RS resource or SP CSI-RS resource, the control channel used by the first MAC CE uses the QCL information corresponding to the AP CSI-RS transmitted most recently before the first symbol. On the other hand, a control channel DMRS used by the first MAC CE and the AP CSI-RS transmitted most recently before the first symbol are QCL. Here, the first MAC CE is signaling indicating QCL information of the control channel.

The first symbol may be in one of the manners described below.

Manner one: The N1-th symbol before the control channel used by the first MAC CE is the first symbol. In other words, if the first symbol of the control channel used by the first MAC CE is symbol n, the first symbol is symbol (n−N1).

Manner two: The first symbol after the first MAC CE is validated is the first symbol.

Manner three: The N2-th symbol before the first MAC CE is validated is the first symbol. In other words, if the first symbol before the first MAC CE is validated is symbol n, the first symbol is symbol (n−N2).

The technical schemes provided in examples one to six simply and clearly define the first DCI, the second DCI, the target channel or the target signal scheduled by the first DCI, or the CSI-RS triggered by the second DCI, or the timing relationship between at least two of the first DCI, the second DCI, the target channel or signal scheduled by the first DCI, or the CSI-RS triggered by the second DCI, solving the problem that the terminal has a fuzzy understanding or insufficient processing capability.

Specifically, the values of N1, N2, M1, M2, S1, S2, K, and the like in the above embodiments may each be a natural number greater than or equal to 1.

Embodiment Three

Figure 8:
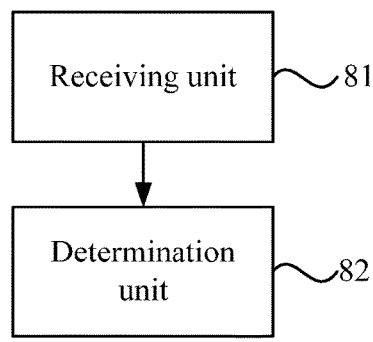
FIG. 8 is a structure diagram of a terminal according to embodiment three of the present application.

FIG. 8 is a structure diagram of a terminal according to embodiment three of the present application. As shown in FIG. 8, a terminal is provided in embodiment three of the present disclosure. The terminal includes a receiving unit 81 and a determination unit 82. The receiving unit 81 is configured to receive first signaling and second signaling, where the first signaling includes a transmission configuration indication (TCI) state, and the second signaling is configured for triggering a first reference signal indicated in the TCI state. The determination unit 82 is configured to determine, according to the first signaling, a target channel or a target signal scheduled by the first signaling, where a target channel or a target signal scheduled by the first signaling uses QCL information corresponding to the first reference signal transmitted before a first symbol or QCL information corresponding to the second signaling transmitted before a first symbol.

The target channel or the target signal is at least one of: a data channel, a second reference signal, or a control channel.

The first reference signal or second signaling transmitted before the first symbol refers to that the last symbol of the first reference signal or the second signaling is before the first symbol.

The first symbol is at least one of: a first time domain symbol occupied by the first signaling; a first time domain symbol occupied by the physical channel where the first signaling is located; the N1-th time domain symbol before the target channel or signal scheduled by the first signaling; the N2-th time domain symbol before the first signaling; or the N2-th time domain symbol before the physical channel where the first signaling is located.

The target channel or the target signal scheduled by the first signaling uses QCL information corresponding to the second signaling or the first reference signal transmitted most recently before a first symbol. Alternatively, the terminal itself decides to use QCL information corresponding to the second signaling or the first reference signal transmitted some time before the first symbol, instead of being limited to QCL information corresponding to the second signaling or the first reference signal transmitted most recently before the first symbol.

At least M1 time domain symbols are spaced between the first symbol and the first reference signal transmitted most recently before the first symbol.

At least M2 time domain symbols are spaced between the target channel or the target signal scheduled by the first signaling and the first reference signal transmitted most recently before the first symbol.

In a case where a trigger delay of the first reference signal transmitted most recently before the first symbol is greater than or equal to a threshold K, the target channel or the target signal scheduled by the first signaling uses the QCL information corresponding to the first reference signal transmitted most recently before the first symbol.

The trigger delay is the number of time domain symbols between the second signaling and transmission of the first reference signal triggered by the second signaling.

In a case where a trigger delay of the first reference signal transmitted most recently before the first symbol is less than a threshold K and the number of symbols between a first symbol of the target channel or the target signal scheduled by the first signaling and the second signaling is greater than K, the target channel or the target signal scheduled by the first signaling uses the QCL information corresponding to the second signaling transmitted most recently before the first symbol.

The trigger delay is the number of time domain symbols between the second signaling and transmission of the first reference signal triggered by the second signaling.

The threshold K is the number of time domain symbols required by a terminal and between the first signaling and a channel or a signal using the TCI state included in the first signaling.

The target channel or the target signal scheduled by the first signaling uses QCL information used by a first reference signal corresponding to a CSI report transmitted most recently before the first symbol.

The terminal further includes a reporting unit configured to report at least one of the following pieces of information: information about the number of symbols required by the terminal and between the first signaling scheduling the target channel or the target signal and the second signaling triggering the first reference signal indicated in the TCI state most recently before the first signaling; information about the number of symbols required by the terminal and between the target channel or the target signal scheduled by the first signaling and the second signaling transmitted most recently before the target channel or the target signal; the number of symbols required by the terminal and between the first reference signal transmitted most recently before the first signaling and the first signaling; or the number of symbols required by the terminal and between the target channel or the target signal scheduled by the first signaling and the first reference signal transmitted most recently before the target channel or the target signal.

The determination unit is further configured to determine a value of at least one of M1, M2, N1, or N2 in at least one of the manners described below.

Manner one: The value is determined according to a preset value.

Manner two: The value is determined according to capability information of the terminal. The capability information includes at least one of: a threshold K; the number B of times the terminal is capable of changing a spatial QCL parameter within one slot; the number of symbols required by the terminal and between signaling scheduling an uplink transmission and the scheduled uplink transmission; the number of symbols required by the terminal and between the second signaling triggering the first reference signal and transmission of the first reference signal; or the number of symbols required by the terminal and from a transmission of the first reference signal to reporting of CSI corresponding to the first reference signal.

Manner three: The value is determined according to configuration information of a reference signal set where a first reference signal resource is located or a first reference signal resource, and such determination includes at least one of: determination according to whether the reference signal set where the first reference signal resource is located is configured with repeat indication information; or determination according to the number of resources included in the reference signal set where the first reference signal resource is located.

Manner four: The value is determined according to a QCL category included in the TCI state in the first signaling.

Manner five: The value is determined according to whether the first signaling and the second signaling are from a same serving cell.

The first signaling and the second signaling are from a same serving cell.

The first signaling, the second signaling, and the target channel or the target signal scheduled by the first signaling are in a same serving cell.

The first signaling, the second signaling, the first reference signal triggered by the second signaling, and the target channel or the target signal scheduled by the first signaling are in a same serving cell.

At least two of the first signaling, the second signaling, the first reference signal triggered by the second signaling, or the target channel or the target signal scheduled by the first signaling are from different serving cells, and the first reference signal triggered by the second signaling, the target channel or the target signal scheduled by the first signaling, and/or a control channel where signaling is located correspond to same subcarrier spacing.

Embodiment Four

Figure 9:
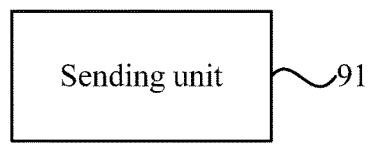
FIG. 9 is a structure diagram of a base station according to embodiment four of the present application.

FIG. 9 is a structure diagram of a base station according to embodiment four of the present disclosure. As shown in FIG. 9, a base station is provided in embodiment four of the present disclosure. The base station includes a sending unit 91 configured to send first signaling and second signaling. The first signaling includes a TCI state, and the second signaling is configured for triggering a first reference signal indicated in the TCI state. A target channel or a target signal scheduled by the first signaling uses QCL information corresponding to the first reference signal transmitted before a first symbol or QCL information corresponding to the second signaling transmitted before a first symbol.

The target channel or the target signal is at least one of: a data channel, a second reference signal, or a control channel.

The first reference signal or second signaling transmitted before the first symbol refers to that the last symbol of the first reference signal or the second signaling is before the first symbol.

The first symbol is at least one of: a first time domain symbol occupied by the first signaling; a first time domain symbol occupied by the physical channel where the first signaling is located; the N1-th time domain symbol before the target channel or signal scheduled by the first signaling; the N2-th time domain symbol before the first signaling; or the N2-th time domain symbol before the physical channel where the first signaling is located.

The target channel or the target signal scheduled by the first signaling uses QCL information corresponding to the second signaling or the first reference signal transmitted most recently before a first symbol.

At least M1 time domain symbols are spaced between the first symbol and the first reference signal transmitted most recently before the first symbol.

At least M2 time domain symbols are spaced between the target channel or the target signal scheduled by the first signaling and the first reference signal transmitted most recently before the first symbol.

At least M2 symbols are spaced between the target channel or the target signal scheduled by the first signaling and the first reference signal transmitted most recently before the first symbol. Alternatively, the terminal itself decides to use QCL information corresponding to the second signaling or the first reference signal transmitted some time before the first symbol, instead of being limited to QCL information corresponding to the second signaling or the first reference signal transmitted most recently before the first symbol. In a case where a trigger delay of the first reference signal transmitted most recently before the first symbol is greater than or equal to a threshold K, the target channel or the target signal scheduled by the first signaling uses the QCL information corresponding to the first reference signal transmitted most recently before the first symbol.

The trigger delay is the number of time domain symbols between the second signaling and transmission of the first reference signal triggered by the second signaling.

In a case where a trigger delay of the first reference signal transmitted most recently before the first symbol is less than a threshold K and the number of symbols between a first symbol of the target channel or the target signal scheduled by the first signaling and the second signaling is greater than K, the target channel or the target signal scheduled by the first signaling uses the QCL information corresponding to the second signaling transmitted most recently before the first symbol.

The trigger delay is the number of time domain symbols between the second signaling and transmission of the first reference signal triggered by the second signaling.

The threshold K is the number of time domain symbols required by a terminal and between the first signaling and a channel or a signal using the TCI state included in the first signaling.

The target channel or the target signal scheduled by the first signaling uses QCL information used by a first reference signal corresponding to a CSI report transmitted most recently before the first symbol.

The base station further includes a receiving unit configured to receive at least one of the following pieces of information reported by the terminal: information about the number of symbols required by the terminal and between the first signaling scheduling the target channel or the target signal and the second signaling triggering the first reference signal indicated in the TCI state most recently before the first signaling; information about the number of symbols required by the terminal and between the target channel or the target signal scheduled by the first signaling and the second signaling transmitted most recently before the target channel or the target signal; the number of symbols required by the terminal and between the first reference signal transmitted most recently before the first signaling and the first signaling; or the number of symbols required by the terminal and between the target channel or the target signal scheduled by the first signaling and the first reference signal transmitted most recently before the target channel or the target signal.

The base station further includes a determination unit configured to determine a value of at least one of M1, M2, N1, or N2 in at least one of the manners described below.

Manner one: The value is determined according to a preset value.

Manner two: The value is determined according to capability information reported by the terminal. The capability information includes at least one of: a threshold K; the number of times the terminal is capable of changing a spatial QCL parameter within one slot; the number of symbols required by the terminal and between signaling scheduling an uplink transmission and the scheduled uplink transmission; the number of symbols required by the terminal and between the second signaling triggering the first reference signal and transmission of the first reference signal; or the number of symbols required by the terminal and from a transmission of the first reference signal to reporting of CSI corresponding to the first reference signal.

Manner three: The value is determined according to configuration information of a reference signal set where a first reference signal resource is located or a first reference signal resource, and such determination specifically includes at least one of: determination according to whether the reference signal set where the first reference signal resource is located is configured with repeat indication information; or determination according to the number of resources included in the reference signal set where the first reference signal resource is located.

Manner four: The value is determined according to a QCL category included in the TCI state in the first signaling.

Manner five: The value is determined according to whether the first signaling and the second signaling are from a same serving cell.

The first signaling and the second signaling are from a same serving cell.

The first signaling, the second signaling, and the target channel or the target signal scheduled by the first signaling are in a same serving cell.

The first signaling, the second signaling, the first reference signal triggered by the second signaling, and the target channel or the target signal scheduled by the first signaling are in a same serving cell.

At least two of the first signaling, the second signaling, the first reference signal triggered by the second signaling, or the target channel or the target signal scheduled by the first signaling are from different serving cells, and the first reference signal triggered by the second signaling, the target channel or the target signal scheduled by the first signaling, and/or a control channel where signaling is located correspond to same subcarrier spacing.

A terminal is further provided in the embodiments of the present disclosure. The terminal includes a memory, a processor, and a computer program stored in the memory and executable by the processor. When the computer program is executed by the processor, any above information transmission method executed by the terminal is performed.

A base station is further provided in the embodiments of the present disclosure. The terminal includes a memory, a processor, and a computer program stored in the memory and executable by the processor. When the computer program is executed by the processor, any above information transmission method executed by the base station is performed.

A computer-readable storage medium is further provided in the embodiments of the present disclosure. The computer-readable storage medium stores an information processing program. When the information processing program is executed by a processor, any above information transmission method is performed.

It is to be understood by those of ordinary skill in the art that all or some of the steps and systems in the methods disclosed herein and all or some of the functional modules/units in the apparatuses disclosed herein may be implemented as software, firmware, hardware or a suitable combination thereof. In the hardware implementation, the division of the functional modules/units mentioned above may not correspond to the division of physical components. For example, one physical component may have multiple functions, or one function or step may be performed jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random access memory (RAM), a read-only memory (ROM), an electrically erasable programmable read-only memory (EEPROM), a flash memory or another memory technology, a compact disc read-only memory (CD-ROM), a digital versatile disc (DVD) or another optical disc storage, a magnetic cassette, a magnetic tape, disk storage or another magnetic storage apparatus, or any other medium used to store the desired information and accessible by a computer. Moreover, it is known to those of ordinary skill in the art that communication media typically include computer-readable instructions, data structures, program modules or other data in modulated data signals such as carrier waves or other transport mechanisms and may include any information delivery medium.

Although the embodiments disclosed by the present application are as described above, the content thereof is merely embodiments for facilitating the understanding of the present application and not intended to limit the present application. Any person skilled in the art to which the present application pertains may make any modifications and variations on the implementation forms and details without departing from the spirit and scope disclosed by the present application, but the patent protection scope of the present application is still subject to the scope defined by the appended claims.

What is claimed is:

1. An information transmission method, comprising:
   receiving, by a terminal, first signaling and second signaling,
   wherein the first signaling is configured for indicating a transmission configuration indication (TCI) state, and the second signaling is configured for triggering a first reference signal indicated in the TCI state; and
   determining, by the terminal according to the first signaling, a target channel or a target signal scheduled by the first signaling,
   wherein the target channel or the target signal scheduled by the first signaling uses quasi-co-location (QCL) information corresponding to the first reference signal transmitted before a first symbol or QCL information corresponding to the second signaling transmitted before a first symbol,
   wherein the first symbol comprises at least one of:
   a first time domain symbol occupied by the first signaling;
   a first time domain symbol occupied by a physical channel where the first signaling is located;
   an N1-th time domain symbol before the target channel or the target signal scheduled by the first signaling, wherein N1 is a positive integer;
   an N2-th time domain symbol before the first signaling, wherein N2 is a positive integer; or
   an N2-th time domain symbol before a physical channel where the first signaling is located, wherein N2 is a positive integer.

2. The method of claim 1, wherein
   the target channel or the target signal comprises at least one of: a data channel, a second reference signal, or a control channel.

3. The method of claim 1, wherein
   the target channel or the target signal scheduled by the first signaling uses QCL information corresponding to the first reference signal transmitted most recently before the first symbol or QCL information corresponding to the second signaling transmitted most recently before the first symbol.

4. The method of claim 3, wherein
   at least M1 time domain symbols are spaced between the first symbol and the first reference signal transmitted most recently before the first symbol, and M1 is a positive integer.

5. The method of claim 3, wherein
   at least M2 time domain symbols are spaced between the target channel or the target signal scheduled by the first signaling and the first reference signal transmitted most recently before the first symbol, and M2 is a positive integer.

6. The method of claim 3, wherein
   in a case where a trigger delay of the first reference signal transmitted most recently before the first symbol is greater than or equal to a threshold K, the target channel or the target signal scheduled by the first signaling uses the QCL information corresponding to the first reference signal transmitted most recently before the first symbol;
   wherein the trigger delay is a number of time domain symbols between the second signaling and the first reference signal triggered by the second signaling.

7. The method of claim 3, wherein
   in a case where a trigger delay of the first reference signal transmitted most recently before the first symbol is less than a threshold K and a number of symbols between a first symbol of the target channel or the target signal scheduled by the first signaling and the second signaling is greater than K, the target channel or the target signal scheduled by the first signaling uses the QCL information corresponding to the second signaling transmitted most recently before the first symbol;
   wherein the trigger delay is a number of time domain symbols between the second signaling and the first reference signal triggered by the second signaling.

8. The method of claim 1, wherein the target channel or the target signal scheduled by the first signaling uses QCL information used by a first reference signal corresponding to a channel state information (CSI) report transmitted most recently before the first symbol.

9. An information transmission method, comprising:
   sending, by a base station, first signaling and second signaling;
   wherein the first signaling comprises a transmission configuration indication (TCI) state, and the second signaling is configured for triggering a first reference signal indicated in the TCI state;
   wherein a target channel or a target signal scheduled by the first signaling uses quasi-co-location (QCL) information corresponding to the first reference signal transmitted before a first symbol or QCL information corresponding to the second signaling transmitted before a first symbol,
   wherein the first symbol comprises at least one of:
   a first time domain symbol occupied by the first signaling;
   a first time domain symbol occupied by a physical channel where the first signaling is located;
   an N1-th time domain symbol before the target channel or the target signal scheduled by the first signaling, wherein N1 is a positive integer;
   an N2-th time domain symbol before the first signaling, wherein N2 is a positive integer; or
   an N2-th time domain symbol before a physical channel where the first signaling is located, wherein N2 is a positive integer.

10. The method of claim 9, wherein
    the target channel or the target signal comprises at least one of: a data channel, a second reference signal, or a control channel.

11. The method of claim 9, wherein
    the target channel or the target signal scheduled by the first signaling uses QCL information corresponding to the first reference signal transmitted most recently before the first symbol or QCL information corresponding to the second signaling transmitted most recently before the first symbol.

12. The method of claim 11, wherein
    at least M1 time domain symbols are spaced between the first symbol and the first reference signal transmitted most recently before the first symbol, and M1 is a positive integer.

13. The method of claim 11, wherein
at least M2 time domain symbols are spaced between the target channel or the target signal scheduled by the first signaling and the first reference signal transmitted most recently before the first symbol, and M2 is a positive integer.

14. The method of claim 11, wherein
in a case where a trigger delay of the first reference signal transmitted most recently before the first symbol is greater than or equal to a threshold K, the target channel or the target signal scheduled by the first signaling uses the QCL information corresponding to the first reference signal transmitted most recently before the first symbol;
wherein the trigger delay is a number of time domain symbols between the second signaling and the first reference signal triggered by the second signaling.

15. The method of claim 11, wherein
in a case where a trigger delay of the first reference signal transmitted most recently before the first symbol is less than a threshold K and a number of symbols between a first symbol of the target channel or the target signal scheduled by the first signaling and the second signaling is greater than K, the target channel or the target signal scheduled by the first signaling uses the QCL information corresponding to the second signaling transmitted most recently before the first symbol;
wherein the trigger delay is a number of time domain symbols between the second signaling and the first reference signal triggered by the second signaling.

16. The method of claim 9, wherein
the target channel or the target signal scheduled by the first signaling uses QCL information used by a first reference signal corresponding to a channel state information (CSI) report transmitted most recently before the first symbol.

17. A terminal, comprising:
a processor and a memory storing processor-executable instructions which, when executed by the processor, are configured to:
receive first signaling and second signaling,
wherein the first signaling comprises a transmission configuration indication (TCI) state, and the second signaling is configured for triggering a first reference signal indicated in the TCI state; and
determine, according to the first signaling, a target channel or a target signal scheduled by the first signaling,
wherein a target channel or a target signal scheduled by the first signaling uses quasi-co-location (QCL) information corresponding to the first reference signal transmitted before a first symbol or QCL information corresponding to the second signaling transmitted before a first symbol,
wherein the first symbol comprises at least one of:
a first time domain symbol occupied by the first signaling;
a first time domain symbol occupied by a physical channel where the first signaling is located;
an N1-th time domain symbol before the target channel or the target signal scheduled by the first signaling, wherein N1 is a positive integer;
an N2-th time domain symbol before the first signaling, wherein N2 is a positive integer; or
an N2-th time domain symbol before a physical channel where the first signaling is located, wherein N2 is a positive integer.

18. A base station, comprising:
a processor and a memory storing processor-executable instructions which, when executed by the processor, are configured to implement the information transmission method of claim 6.

* * * * *